US008199895B2

(12) United States Patent
Ely et al.

(10) Patent No.: US 8,199,895 B2
(45) Date of Patent: Jun. 12, 2012

(54) LEVERAGING A SIP FORKING MODEL FOR DISTRIBUTED CONTACT CENTER ROUTING

(75) Inventors: Michael Ely, Pelham, NH (US); Malcom Strandberg, Cambridge, MA (US)

(73) Assignee: Aspect Software, Inc., Lombard, IL (US)

( * ) Notice: Subject to any disclaimer, the term of this patent is extended or adjusted under 35 U.S.C. 154(b) by 1023 days.

(21) Appl. No.: 12/054,209

(22) Filed: Mar. 24, 2008

(65) Prior Publication Data
US 2009/0238359 A1 Sep. 24, 2009

(51) Int. Cl.
*H04M 3/42* (2006.01)
(52) U.S. Cl. ............... 379/212.01; 379/219; 379/220.01; 379/221.01; 379/221.05; 379/221.14
(58) Field of Classification Search ............. 379/212.01, 379/211.02, 265.09, 266.01
See application file for complete search history.

(56) References Cited

U.S. PATENT DOCUMENTS

| | | | | |
|---|---|---|---|---|
| 6,347,139 B1 * | 2/2002 | Fisher et al. | ............. | 379/265.12 |
| 2006/0115058 A1 * | 6/2006 | Alexander et al. | ......... | 379/90.01 |
| 2007/0036331 A1 * | 2/2007 | Fitzgerald | ............... | 379/265.02 |
| 2008/0260137 A1 * | 10/2008 | Poi et al. | .................. | 379/212.01 |
| 2009/0103691 A1 * | 4/2009 | Hume et al. | ............... | 379/88.17 |

OTHER PUBLICATIONS

Rosenberg et al—RFC 3261—Jun. 2002.*

* cited by examiner

*Primary Examiner* — Curtis Kuntz
*Assistant Examiner* — Joseph J. Nguyen
(74) *Attorney, Agent, or Firm* — Husch Blackwell LLP

(57) ABSTRACT

A method and apparatus are provided for transferring contacts among automatic contact distributors of an automatic contact distribution system. The method includes the steps of collecting information from a contact through an interactive voice response unit of a broker automatic call distributor of the automatic contact distribution system, incorporating the collected information into a SIP message, forking the SIP message from the broker automatic contact distributor to a plurality of other automatic contact distributors of the automatic contact distribution system and transferring the contact from the broker automatic contact distributors to one of the plurality of automatic contact distributors.

34 Claims, 3 Drawing Sheets

LEVERAGING A SIP FORKING MODEL FOR DISTRIBUTED CONTACT CENTER ROUTING

FIELD OF THE INVENTION

The field of the invention relates to communication systems and more particularly to automatic contact distributors.

BACKGROUND OF THE INVENTION

Automatic contact distributors (ACDs) are generally known. Such systems are typically used by organizations to process contacts with clients of the organization. Typically, contacts with clients are directed to one or more communication system ports (e.g., telephone numbers, e-mail addresses, etc.) and distributed to agents based upon some criteria (e.g., agent idle time).

In general, ACDs are used to process both inbound or outbound contacts. Typically, a controller monitors a workload of its agents. Where a workload of received contacts fall below some threshold value, the controller may begin to initiate outbound contacts.

In addition to placing and distributing contacts, an ACD may also identify and display documents on agent terminals as an aid to processing the contacts. In the case of incoming contacts, the contacts may be received along with ancillary information (e.g., e-mail source and destination URLs, dialed number identification service (DNIS), automatic number identification (ANI) information, etc.). Source and destination information may be used to identify a caller and purpose of the contact before or at the same instant as the contact is delivered to the ACD. The controller of the ACD may use the source information to retrieve and display client records on a terminal of the agent selected to handle the contact at the same instant that the contact is delivered to the agent.

While automatic contact distributors work relatively well, they are not particularly well suited for distributing calls among ACDs, especially if they are of different types. Accordingly, a need exists for a better method of handling such calls.

SUMMARY

A method and apparatus are provided for transferring contacts among automatic contact distributors of an automatic contact distribution system. The method includes the steps of collecting information from a contact through an interactive voice response unit of a broker automatic call distributor of the automatic contact distribution system, incorporating the collected information into a SIP message, forking the SIP message from the broker automatic contact distributor to a plurality of other automatic contact distributors of the automatic contact distribution system and transferring the contact from the broker automatic contact distributors to one of the plurality of other automatic contact distributors.

DETAILED DESCRIPTION OF AN ILLUSTRATED EMBODIMENT

Figure 1:
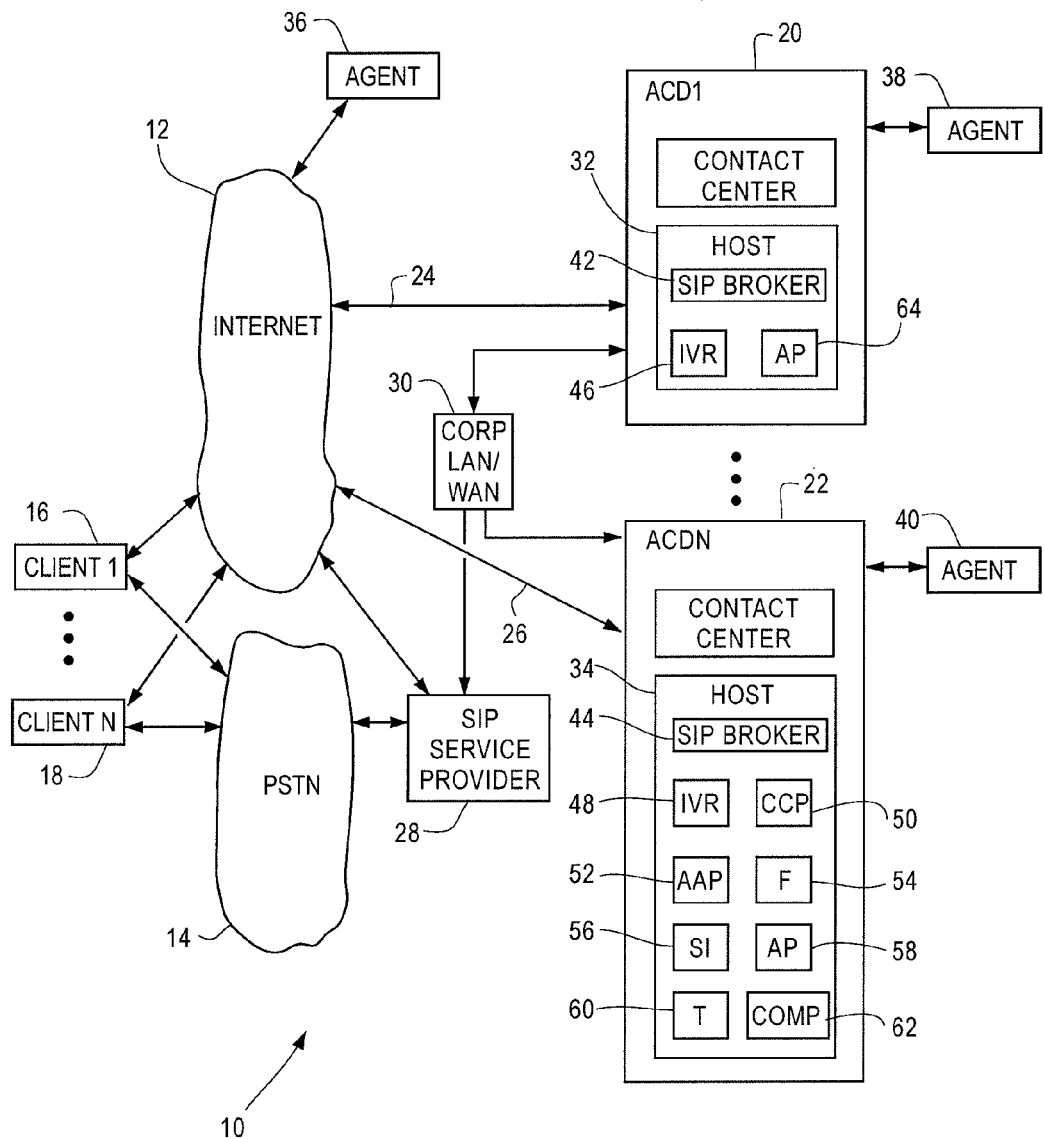
FIG. 1 is a block diagram of an automatic contact distribution system in accordance with an illustrated embodiment of the invention.

FIG. 1 depicts an automatic contact distribution (ACD) system 10 using Session Initiation Protocol (SIP) shown generally in accordance with an illustrated embodiment of the invention. Included within the automatic contact distribution system 10 may be a number of ACDs 20, 22. As shown, the ACDs 20, 22 of the system 10 may receive or place contacts through the Internet 12 or any other public or private network 14, 28 capable of handling SIP traffic.

The system 10 may be connected directly to the Internet 12 through one or more local Internet connections 24, 26. However, in order to simplify security, routing and other concerns, the system 10 may also be connected to the Internet 12 through a LAN/WAN network 30 and SIP service provider 28.

The use of a SIP protocol allows participants to establish a session wherein one or more media streams is exchanged with each participant. The media streams may be audio, video or any other combination of Internet-based communication mediums. The simultaneous setup and use of audio and video by the system 10 for one call between two or more parties is one example.

In general, the system 10 may be used by any of a number of different organizations (e.g., commercial, environmental, political, etc.) to advance the agenda of the organization. Access to the contact center 10 may be provided through the Internet 12 under any of a number of different processes. In order to promulgate the agenda of the organization to its clients 16, 18, the organization may publish, by advertising or otherwise, one or more telephone numbers or universal resource locators (URLs) that identify communication paths to the organization.

The system 10 may include one or more hosts 32, 34 that place and receive calls and that distributes those calls to agents 36, 38, 40 of the organization. One or more agent selection applications may be provided within the respective hosts 32, 34 for detecting calls and for selecting an agent for handling each call.

Calls may be placed to and received from the organization (i.e., from the system 10) using any of a number of different communication devices. For example, clients may place or receive calls through a SIP telephone or personal computer 16, 18 that is equipped with SIP communication software and that is connected either directly to the Internet 12 or indirectly through an Internet Service Provider (ISP).

For example, to contact the organization, a client may enter a published telephone number of the organization into his SIP telephone. Entry of a telephone number into the SIP telephone causes the telephone to compose a number of messages that ultimately result in a contact being directed to the organization.

In order to contact the organization, the telephone must first locate a proxy server (within the SIP service provider 28). To locate a proxy server, the telephone may first perform a DNS SRV query to locate a proxy server. Upon locating a proxy server, the telephone may compose a SIP INVITE that incorporates the entered telephone number and send the packet message to the proxy server. As used herein, an INVITE is an Internet SIP message composed in accordance with the Internet Engineering Task Force (IETF) RFC #3261.

As a first step in forwarding the INVITE, the proxy server may send a query to a registration server to identify a URL of the organization. The registration server serves as a registrar for PSTN telephone numbers registered by web entities. Registration with the registration server in this case means registering a URL that corresponds to the registered PSTN telephone number.

The URL may be used to route the INVITE to a SIP broker 42, 44 of the ACDs 20, 22. The SIP broker 42, 44 may be part of an ACD 20, 22 as shown in FIG. 1 or may be part of some other stand-alone call processing unit. For example, the SIP broker 42, 44 may be part of a dialer or PBX that places calls and then decides how to handle placed calls based upon whether the call is answered by a human or telephone answering machine. For purposes of explanation, the SIP broker 42, 44 will be assumed to be part of an ACD 22 as shown in FIG. 1.

As each INVITE is received, one or more processing applications within the host 32, 34 may be used to route the contact to the appropriate call processing entity. For example, a call classification processor 50 within the host 34 may retrieve source and destination URLs from the INVITE. The destination URL may be used as an indication of the purpose of the call where the organization reserves different URLs for different types of clients. Similarly, the source URL may be compared with a database to identify existing clients. Together the source and destination URLs may be used to classify contacts into one more specific types based upon a predetermined criteria. Any classification information, including any retrieved client records and probable purpose of the contact may be saved in a contact file 54.

Once a contact is classified, the contact file may be transferred to an agent assignment processor 52. Within the agent assignment processor 52, the contact file may be used to select an agent group by matching the classification with an agent group. Once matched with an agent group, the agent assignment processor 52 may attempt to identify an available agent 36, 38, 40. Identification of an agent may be based upon any appropriate criteria (e.g., longest available, most skilled for the contact classification, etc.). Once an available agent 36, 38, 40 is identified, the agent assignment processor 52 may redirect the INVITE to the agent 36, 38, 40.

Upon receiving the INVITE, the agent 36, 38, 40 may return a "SIP/2.0 200 OK" to the client 16, 18. In response, the client 16, 18 may return a "SIP/2.0 ACK" message and then proceed to negotiate an appropriate voice or audio/video connection.

Alternatively, the agents 36, 38, 40 in the selected agent group may be previously occupied by prior calls. In this case, the agent assignment processor 52 may place the contact in a contact queue pending availability of an agent 36, 38, 40.

Alternatively (or if the identity of the client 16, 18 or purpose of the contact cannot be determined from the INVITE), then the broker 42, 44 may connect the contact to an interactive voice response unit (IVR) 46, 48. In this case, the broker 42, 44 may transfer the INVITE to the IVR 46, 48. In response, the IVR 46, 48 may transfer a "SIP/2.0 OK" to the client 16, 18. The client 16, 18 may respond with a "SIP/2.0 ACK" and the IVR 46, 48 and client 16, 18 may proceed to set up a voice channel between the client 16, 18 and IVR 46, 48.

Upon completion of the voice channel, the IVR 46, 48 may audibly prompt the client 16, 18 for information about the identity of the client 16, 18 or for the purpose of the contact. In response, the client 16, 18 may provide identifying information (e.g., personal identifier, account number, etc.) and/or a reason for the contact (e.g., a question about his/her account, a question about a product, etc.). Any additional information provided by the client 16, 18 is added to the contact file 54.

Once the additional information has been collected and placed in the file 54, the contact may be transferred back to the call classification processor 50 and/or agent assignment processor 52. Within the agent assignment processor 52, the contact may again be processed to identify an agent. If an agent can be identified, then the contact may be assigned to an agent 36, 38, 40.

Alternatively, the agent assignment processor 52 may also track the total time that the contact has been waiting for an agent using a queue timer 60. If the total time that the contact has been waiting in a contact queue exceeds some predetermined threshold or if the new information collected through the IVR 46, 48 indicates that the contact should be handled by another agent group, then the agent assignment processor 52 may notify the SIP broker 42, 44 that the contact should be transferred to another ACD 20, 22.

In order to transfer the contact to another ACD 20, 22, the transferring broker 42, 44 composes and sends a SIP INVITE 56 addressed to the other potential transferree ACDs 20, 22 of the ACD system 10. Incorporated into a user data field of the SIP INVITE 56 is a copy of the file 54.

It may be assumed in this regard, that each broker 42, 44 has registered its presence with a local SIP REGISTER and that a SIP forking model has been implemented so that any SIP INVITE or SIP REFER sent by one broker 42, 44 to another broker 42, 44 is received by all of the brokers 42, 44.

Upon receipt of the SIP INVITE 56, the other brokers 42, 44 recover and process the file 54 to determine a relative ability of the respective ACDs 20, 22 to handle the contact. The determination of the relative ability to handle the contact may be based upon the calculation of a metric associated with the availability of the ACD 20, 22 to handle additional contacts. For example, if the ACD 20, 22 has an idle agent that is skilled in the type of contact involved, then the ACD 20, 22 may return a metric value of 100. If the ACD 20, 22 does not handle that type of contact, then the ACD 20, 22 may return a value of 0.

Similarly, if the ACD 20, 22 handles the type of contact involved, but has a backlog of similar contacts, then the ACD 20, 22 may return a value between 100 and 0. For example, if the ACD 20, 22 has a maximum allowable wait in queue (threshold value) for a particular call type of 30 seconds, then the returned metric may be scaled based upon the length of the queue. In this case, if the ACD 20, 22 has a queue length of 15 seconds (as measured by a queue timer 60), then the ACD 20, 22 may compare the queue length of 15 seconds within a comparator 62 with the threshold value of 30 and return a value of 50 to indicate that it can handle the contact, but that it has a backlog of contacts of that contact type. Similarly, if the ACD 20, 22 has a queue length of 7 seconds, then that ACD 20, 22 may return a value of 75 to indicate that it can handle that contact and has a relatively short queue.

As a still further alternative, rather than returning a relative value based upon time, the value may be based upon the ability to handle the contact. In this case, the value may be based upon the skill of the ACD's agents. In this case, if there is a 90% match between the classification of the contact and the skill of the agents, then the ACD 20, 22 may return a value of 90.

In each case, the potential transferee ACSs 20, 22 compose a "SIP/2.0 OK" message with additional information. The relative ability of respective ACDs 20, 22 to handle the contact (i.e., the availability metric) is incorporated into the "SIP/2.0 OK" message body as addition data. Alternatively, special tags may be provided incorporating the relative availability value into the message or a related message (e.g., a SIP INFO message).

In each case, the broker 42, 44 of the originating ACD 20, 22 may compare the metric provided by each ACD 20, 22 within an availability processor 64 and transfer the contact to the ACD 20, 22 providing the highest relative availability for handling the contact. Once the originating ACD 20, 22 has selected an ACD 20, 22 to handle the contact, the originating ACD 20, 22 may cancel the pending requests with any other ACDs 20, 22.

Figure 2:
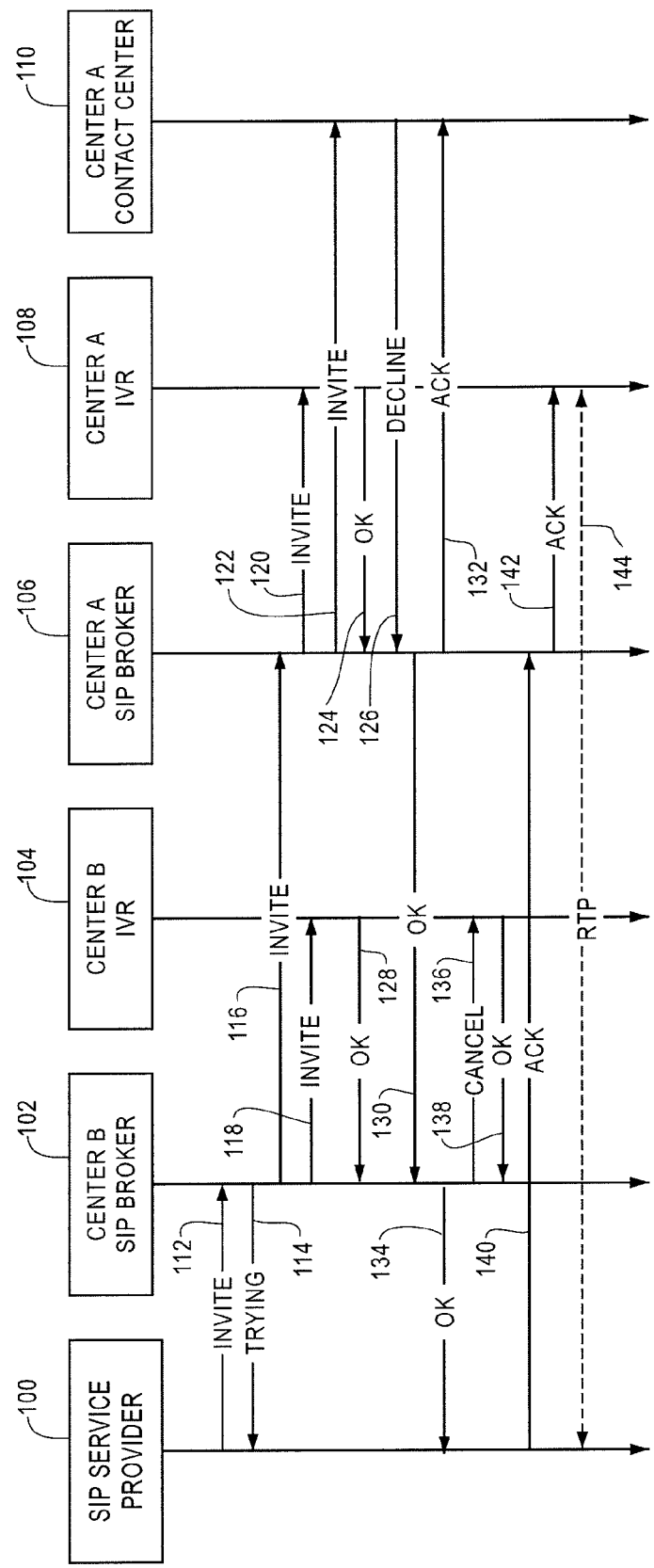
FIG. 2 is a message flow diagram that may be used by the system of FIG. 1

FIG. 2 is a message flow diagram of a first illustrative example of contact transfer. As shown in FIG. 2, the SIP service provider 100 may compose an initial SIP INVITE 112 to an initial ACD 20, 22 (labeled 102 in FIG. 2). The initial ACD 102 responds with a SIP TRYING message 114.

In this case, the initial ACD 102 may find that it doesn't have any available agents 36, 38, 40 to handle the contact, so the ACD 102 (functioning as a SIP broker) composes and sends a SIP INVITE 118 to the IVR 104 of the ACD 102. The ACD 102 also composes and concurrently sends a SIP INVITE 116 to another ACD 106. In each case, the SIP INVITE may include the agent file 54. The IVR 104 may respond with a SIP OK message 128.

The other ACD 106, in turn, transfers a first SIP INVITE to its IVR 108 and to its contact center 110. The IVR 108 responds with a SIP OK. However, the contact center 110 may respond with an initial SIP decline message. The other ACD 106 responds with a SIP ACK message 132 acknowledging the decline message 126.

In this case, an availability processor 58 of the contact center 106 may calculate an availability (e.g., 80) of the contact center 106. The second contact center 106 may also compose an SIP OK message incorporating the calculated availability into the SIP OK message 130.

Upon receiving the SIP OK and calculated availability, the initial ACD 102 may calculate its own availability and transfer if the availability of the initial ACD 102 is lower than that of the other ACD 106. Alternatively, the initial ACD 102 may incorporate its own availability as well as the availability of other ACDs into a SIP OK to another SIP entity and allow transfer to occur through the other entity.

For example, the initial ACD 102 may have a low availability (e.g., 50) if it has a large backlog of calls of this type of contact. In this case, the initial ACD 102 may compose a SIP OK message to the SIP service provider 100 incorporating its own availability (i.e., the availability of the initial ACD 102) and the availability and URL or URI of any other ACDs 106. Since the availability of the other ACD 106 is higher than that of the initial ACD 102, the initial ACD 102 may also send a cancel message 136 to the IVR 104. The IVR 104 may respond with a SIP OK message 138.

In response, the SIP service provider 100 may compare the availabilities of the initial ACD 102 and other ACD 106. Upon determining that the other ACD 106 has a greater availability, the SIP service provider 100 may send a SIP ACK message 140 to the other ACD 106. The other ACD 106 may, in turn, send a SIP ACK message 142 to the IVR 108. The IVR 108, in turn, sets up a real time transport protocol (RTP) connection between the client 16, 18 and IVR 108.

Figure 3:
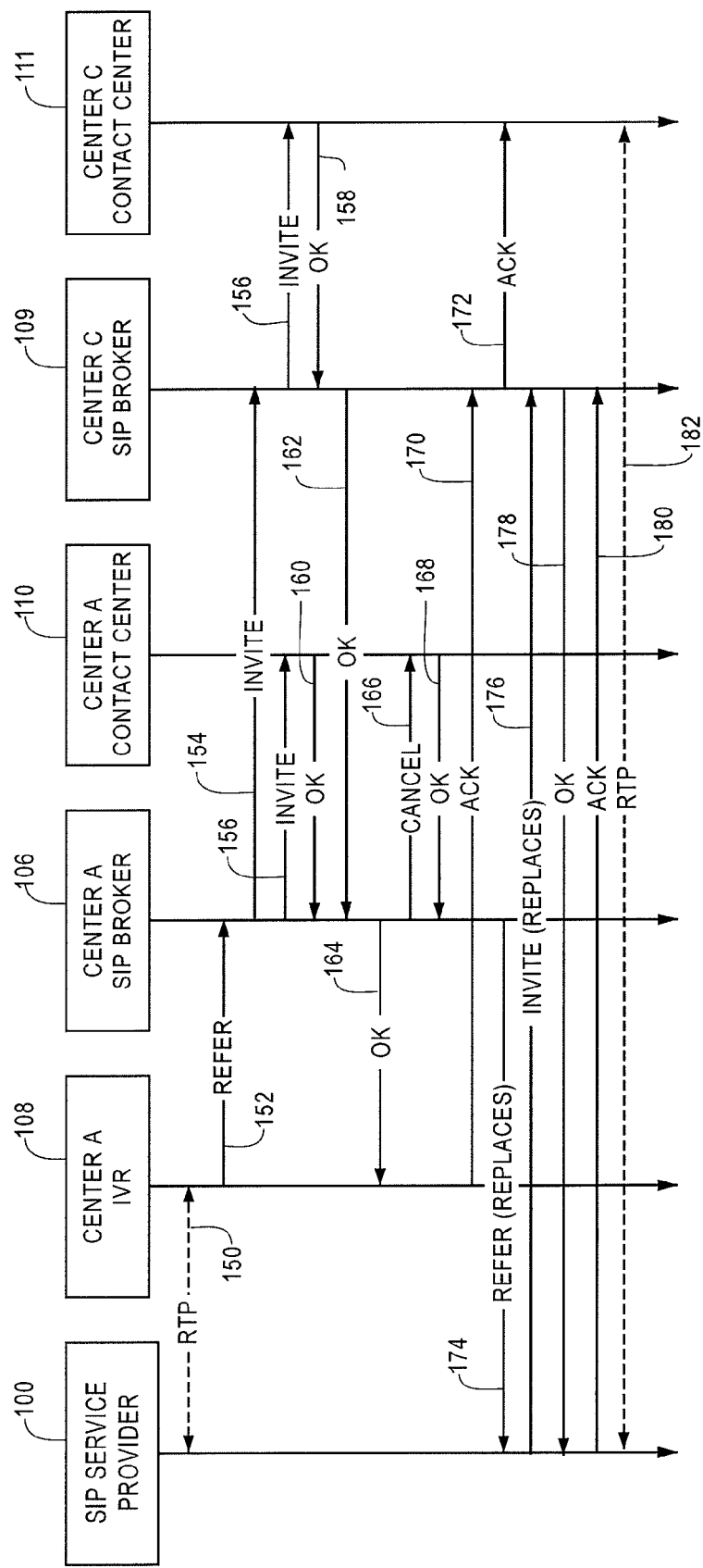
FIG. 3 is a message flow diagram that may be used by the system of FIG. 1 under another example.

FIG. 3 is another message flow diagram continuing the process of FIG. 2. In this example, the IVR 108 has collected further information from the client 16, 18 through the RTP connection 150. The IVR 108 incorporates the additional information into the file 54 and incorporates the file 54 into the SIP REFER message 152 transferred to the ACD 106. The ACD 106 may recover the file 54 and incorporate the file 54 into another set of SIP INVITES, including a first SIP INVITE 156 sent to the contact center 110 of the ACD 106 and also a second SIP INVITE 154 sent to another ACD 109.

The other ACD 109 may, in turn, incorporate the file 54 into a SIP INVITE 156 to the contact center 111 of the ACD 109.

The contact center 111 may, in turn, return a SIP OK message 158 incorporating the availability metric.

The other ACD 109 may calculate an availability if not already calculated by the contact center 111. The calculated availability metric may be incorporated into a SIP OK message 162.

Similarly, the contact center 110 may return a SIP OK message 160, possibly with a calculated availability metric or the ACD 106 may calculate the availability metric. The ACD 106 may compare its own availability with the availability of the other ACD 109. If the other ACD 109 has a greater availability, then the ACD 106 may send a cancel message 166 to its contact center 110. The contact center 110 may respond with a SIP OK 168.

The contact center 106 may also incorporate its own availability as well as the availability of the other contact center 109 into a SIP message 164. The IVR 108 may compare the availabilities and determine that the ACD 109 has the greater availability and return a SIP ACK message 170 to the other ACD 109. The other ACD 109 sends an SIP ACK 172 to its contact center 111.

Since the ACD 109 has a greater availability, the ACD 106 also sends a SIP REFER message 174 to the SIP service provider 100 replacing itself with the other ACD 109. The SIP service provider 100 responds by sending a replacement SIP INVITE 176 to the other ACD 109. The other ACD 109 responds with a SIP OK 178. The SIP service provider 100 sends a SIP ACK 180 to the other ACD 109 followed by set up of the RTP connection 182 with the contact center 111.

The contact distribution system 10 offers a number of advantages over existing systems. For example, the ability to route based upon availability eliminates the need for central resource tracking.

Furthermore, SIP is an industry standard that may already be used by many ACDs for VoIP. Most ACDs have some form of proprietary link that allows inter-ACD traffic. The inter-ACD link could be used by a SIP broker to broker calls among ACDs in a manner that allows ACDs of different types and from different vendors to participate in a single integrated routing system.

Moreover, the transfer does not necessarily involve a transfer among ACDs. As noted in the examples above, transfers could also occur among other devices (e.g., IVRs, dialers, PBXs, etc.) or among an ACD and the other devices.

In addition, the need for pre-call routing is eliminated. By soliciting availability from other ACDs 20, 22, the load is automatically balanced with each call being redirected to the appropriate resource. No custom CTI links are required to supply resource availability.

Moreover, the routing of contacts based upon availability can use virtually any criteria. This allows a broker ACDs 20, 22 to choose from among multiple responders for longest available agent or best skill match routing.

A specific embodiment of method and apparatus for distributing calls has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method of transferring contacts among a plurality of automatic contact distributors of an automatic contact distribution system comprising:
   collecting information from a contact through an interactive voice response unit of an originating broker automatic contact distributor of the automatic contact distribution system;
   incorporating the collected information into a SIP message;
   forking the SIP message from the broker automatic contact distributor to a plurality of other automatic contact distributors of the automatic contact distribution system each respective other automatic contact distributor processing the collected information in the SIP message, calculating a metric characterizing a relative availability of the respective contact distributor to handle the contact, and sending a SIP return message incorporating the respective metric to the originating broker automatic contact distributor;
   incorporating an availability metric for the originating broker automatic contact distributor with the respective metrics of the other contact distributors into a SIP OK message and sending the SIP OK message to another SIP entity; and
   transferring the contact from the originating broker automatic contact distributor to one of the plurality of automatic contact distributors controlled by the other SIP entity.

2. The method of transferring contacts as in claim 1 wherein the SIP message further comprises a SIP INVITE message composed in response to determining to transfer the contact to another of the plurality of contact distributors.

3. The method of transferring contacts as in claim 1 wherein the SIP message further comprises a SIP REFER message.

4. The method of transferring contacts as in claim 1 further comprising each of the plurality of other automatic contact distributors incorporate a SIP broker.

5. The method of transferring contacts as in claim 4 further comprising the plurality of automatic contact distributors determining a type of the contact from the incorporated information.

6. The method of transferring contacts as in claim 5 further comprising the plurality of automatic contact distributors determining a queue time delay for an agent group of the determined contact type.

7. The method of transferring contacts as in claim 6 further comprising the plurality of automatic contact distributors comparing the determined queue time delay with a threshold value.

8. The method of transferring contacts as in claim 7 further comprising when the determined queue delay time exceeds the threshold, then the recipient automatic contact distributors sending a SIP OK message incorporating the respective metric to the originating broker automatic contact distributor.

9. The method of transferring contacts as in claim 1 further comprising the originating broker selecting the one of the plurality of automatic contact distributors for receipt of the contact based upon a relative value of the received metrics and transferring the contact to the selected automatic contact distributor.

10. The method of transferring contacts as in claim 1 further comprising the one automatic contact distributor receiving the contact from the originating broker connecting an interactive voice response unit to the contact and collecting additional information from the contact.

11. The method of transferring contacts as in claim 10 further comprising the one automatic contact distributor incorporating the information collected by the originating broker automatic contact distributor and the information collected by the one automatic contact distributor into a SIP transfer message and forking the SIP transfer message to the plurality of automatic contact distributors.

12. The method of transferring contacts as in claim 11 further comprising the one automatic contact distributor transferring the contact to a third automatic contact distributor based upon a set of responses received from the plurality of automatic contact distributors.

13. An apparatus for transferring contacts among a plurality of automatic contact distributors of an automatic contact distribution system comprising:
   means for collecting information from a contact through an interactive voice response unit of a broker automatic contact distributor of the automatic contact distribution system;
   means for incorporating the collected information into a SIP message;
   means for forking the SIP message from the broker automatic contact distributor to a plurality of other automatic contact distributors of the automatic contact distribution system each respective other automatic contact distributor processing the collected information in the SIP message, calculating a metric characterizing a relative availability of the respective contact distributor to handle the contact, and sending a SIP return message incorporating the respective metric to the broker automatic contact distributor;
   means for incorporating an availability metric for the broker automatic contact distributor with the respective metrics of the other contact distributors into a SIP OK message and sending the SIP OK message to another SIP entity; and
   means for transferring the contact from the broker automatic contact distributors to one of the plurality of automatic contact distributors controlled by the other SIP entity.

14. The apparatus for transferring contacts as in claim 13 wherein the SIP message further comprises a SLP INVITE message.

15. The apparatus for transferring contacts as in claim 13 wherein the SIP message further comprises a SIP REFER message.

16. The apparatus for transferring contacts as in claim 13 further comprising each of the plurality of other automatic contact distributors incorporating a SIP broker.

17. The apparatus for transferring contacts as in claim 16 further comprising means within the plurality of automatic contact distributors for determining a type of the contact from the incorporated information.

18. The apparatus for transferring contacts as in claim 17 further comprising means within the plurality of automatic contact distributors for determining a queue time delay for an agent group of the determined contact type.

19. The apparatus for transferring contacts as in claim 18 further comprising means within the plurality of automatic contact distributors for comparing the determined queue time delay with a threshold value.

20. The apparatus for transferring contacts as in claim 19 further comprising means for sending a SIP OK message to the broker automatic contact distributor when the determined queue delay time exceeds the threshold.

21. The apparatus for transferring contacts as in claim 20 further comprising means for incorporating the metric to the SIP OK message.

22. The apparatus for transferring contacts as in claim 21 further comprising means for selecting the one of the plurality of automatic contact distributor for receipt of the contact based upon a relative value of the received metric.

23. The apparatus for transferring contacts as in claim 13 further comprising the one automatic contact distributor receiving the contact from the broker connecting an interactive voice response unit to the contact and collecting additional information from the contact.

24. The apparatus for transferring contacts as in claim 23 further comprising means within the one automatic contact distributor for incorporating the information collected by the broker automatic contact distributor and the information collected by the one automatic contact distributor into a SIP transfer message and forking the SIP transfer message to the plurality of automatic contact distributors.

25. The apparatus for transferring contacts as in claim 24 further comprising means within the one automatic contact distributor for transferring the contact to a third automatic contact distributor based upon a set of responses received from the plurality of automatic contact distributors.

26. An apparatus for transferring contacts among a plurality of automatic contact distributors of an automatic contact distribution system comprising:
    an interactive voice response unit that collects information from a contact;
    a broker automatic contact distributor that incorporates the collected information into a SIP message;
    a SIP REGISTER that provides information for forking the SIP message from the broker automatic contact distributor to a plurality of other automatic contact distributors of the automatic contact distribution system each respective other automatic contact distributor processing the collected information in the SIP message, calculating a metric characterizing a relative availability of the respective contact distributor to handle the contact, and sending a SIP return message incorporating the respective metric to the broker automatic contact distributor;
    the broker automatic contact distributor incorporating an availability metric for the broker automatic contact distributor with the respective metrics of the other contact distributors into a SIP OK message and sending the SIP OK message to another SIP entity; and
    the other entity controlling transfer of the contact from the broker automatic contact distributor to one of the plurality of automatic contact distributors.

27. The apparatus for transferring contacts as in claim 26 wherein the SIP message further comprises a SIP INVITE message.

28. The apparatus for transferring contacts as in claim 26 wherein the SIP message further comprises a SIP REFER message.

29. The apparatus for transferring contacts as in claim 26 further comprising each of the plurality of other automatic contact distributors having a SIP broker.

30. The apparatus for transferring contacts as in claim 29 further comprising a classification processor within the plurality of automatic contact distributors for determining a type of the contact from the incorporated information.

31. The apparatus for transferring contacts as in claim 30 further comprising a timer within the plurality of automatic contact distributors for determining a queue time delay for an agent group of the determined contact type.

32. The apparatus for transferring contacts as in claim 31 further comprising a comparator within the plurality of automatic contact distributors for comparing the determined queue time delay with a threshold value.

33. The apparatus for transferring contacts as in claim 32 further comprising a SIP OK message incorporating the metric that is sent to the broker automatic contact distributor when the determined queue delay time exceeds the threshold.

34. The apparatus for transferring contacts as in claim 33 further comprising an availability processor that selects the one of the plurality of automatic contact distributor for receipt of the contact based upon a relative value of the received metric.

\* \* \* \* \*